Aug. 7, 1934.  A. ROSCH  1,969,526
POWER PLANT
Filed Feb. 5, 1934
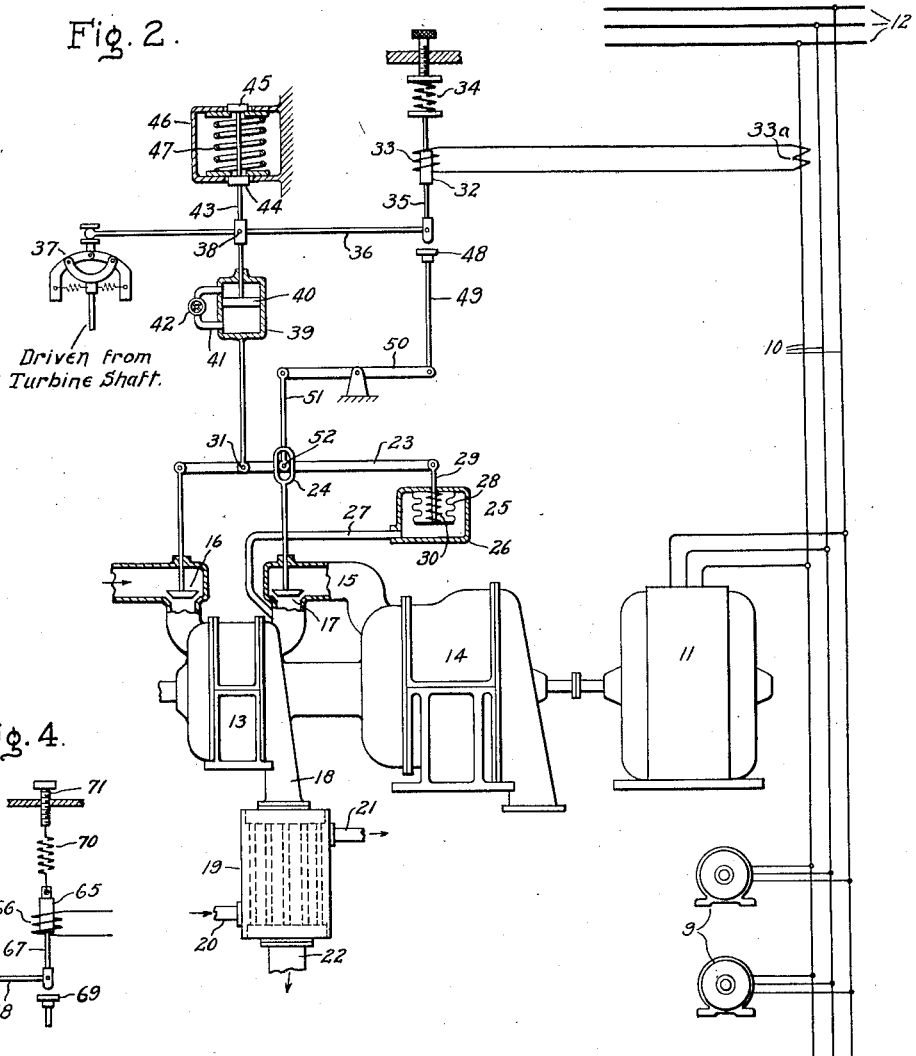
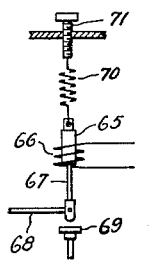
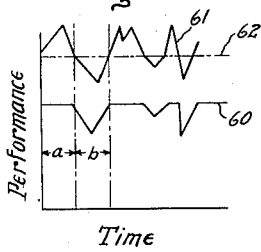
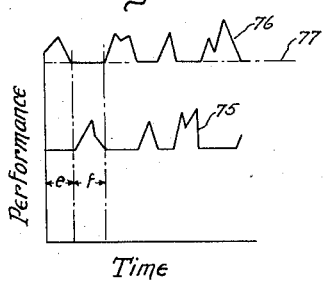
Inventor:
Arthur Rosch,
by Harry E. Dunham
His Attorney.

Patented Aug. 7, 1934

1,969,526

UNITED STATES PATENT OFFICE 1,969,526

POWER PLANT

Arthur Rosch, Brieselang-Sud, Germany, assignor to General Electric Company, a corporation of New York Application February 5, 1934, Serial No. 709,873
In Germany February 9, 1933

6 Claims. (Cl. 290—2)

The present invention relates to power plants for supplying steam or like elastic fluid for industrial purposes, heating or like processes and for supplying electric energy to a power line, which latter is connected to an external power line to draw electric energy from said external power line or supply energy thereto. In many cases the energy drawn from the external line should not exceed a certain maximum value and in other cases the energy supplied to the external line should not drop below a fixed minimum value. From another viewpoint, the invention relates to interconnected power systems, one of which is connected to a generating set and serves to supply energy to various apparatus and draws energy from or supplies electric energy to the other system.

Difficulties are experienced in the regulation of such power systems because of the limited values of power exchange between them and the varying demands of electric energy and process steam. To satisfy the demand of process steam by the provision of conduits with reducing valves for supplying live steam to the processing apparatus is undesirable because the reduction of pressure of the live steam causes a complete loss of energy.

The object of my invention is to provide an improved construction and arrangement of power plants of the kind above specified whereby the generation of electric energy and process steam or like elastic fluid, and in particular the exchange of energy between the two systems, are effectively and efficiently controlled.

For a consideration of what I believe to be novel and my invention, attention is directed to the following description and the claims appended thereto in connection with the accompanying drawing.

Fig. 1 represents a diagram illustrating the performance of a power system according to my invention over a certain period of time, more specifically of a system in which electric energy is drawn from an external line up to a maximum value; Fig. 2 represents an arrangement operating in accordance with the performance indicated in Fig. 1; Fig. 3 is another diagram similar to the one of Fig. 1 but relating to a system in which a fixed minimum amount of electric energy is normally supplied to an external line; and Fig. 4 represents a part of Fig. 1 modified to operate in accordance with the performance set forth with respect to Fig. 3.

A system as shown in Fig. 2 comprises a power line 10 receiving energy from a generator 11 and being interconnected with an external power line 12 to exchange energy therewith. More specifically, in the arrangement of Fig. 2 energy is drawn from the external line 12 up to a fixed maximum value, which value should not be exceeded. The generator 11 is driven by an elastic fluid engine, in the present instance indicated as a turbine having a high pressure part 13 and a low pressure part 14 connected by a cross-over conduit 15. The flow of elastic fluid to the turbine is controlled by an inlet valve 16 and the flow of elastic fluid to the low pressure part of the turbine is controlled by a valve 17 which may be termed an interstage valve because it controls the flow of fluid from a certain stage of the turbine to a lower stage thereof. The turbine normally operates to drive the generator to supply electric energy to the power line in acordance with conditions of the load exchange between the systems 12 and 10, more specifically in response to changes in the flow of load from the system 12 to the system 10. The turbine also operates to supply steam or like elastic fluid for industrial purposes. To this end it is provided with an extraction conduit. More specifically, a stage of the turbine part 13 ahead of the interstage valve 17 has an extraction conduit 18 connected to a heat exchanger 19 or like elastic fluid consumer. The heat exchanger may serve, for example, for heating a substance conducted to the heat exchanger by a conduit 20 and discharged therefrom through a conduit 21. The elastic fluid conducted to the heat exchanger by the extraction conduit 18 is discharged therefrom through an outlet conduit 22.

The two valves 16 and 17 are connected to the left-hand end and an intermediate point respectively of a lever 23. The connection between the lever 23 and the valve 17 includes a lost motion connection 24. The right-hand end of the lever is connected to a pressure regulator including pressure response device 25 which comprises a casing 26 connected by a conduit 27 to the cross-over conduit 15 ahead of the interstage valve 17 as regards the direction of flow of fluid therethrough. A bellows 28 in the casing has a bottom portion connected by a link 29 to the right-hand end of the lever 23. The bellows is biased in downward direction by a spring 30.

Assuming a point 31 of the lever 23 were fixed to form a fulcrum, then the operation of the arrangement so far described would be as follows: A decrease in demand for industrial or process steam causes an increased elastic fluid pressure ahead of the valve 17. This increased pressure effects collapsing of the bellows 28 against the biasing force of the spring 30 whereby the link 29 with the right-hand end of lever 23 moves upward about the fixed point 31 and causes closing movement of valve 16. The closing of valve 16 decreases the flow of fluid to the turbine, resulting in a decreased pressure of the fluid supplied to the heat exchanger. In other words, the pressure regulator serves to normally maintain the pressure of the fluid supplied to the heat exchanger constant.

In case the valve 17 is near closed position, a decrease in the demand for process steam causes closing of the valve 16 and simultaneously opening of the valve 17. The latter movement takes place through the lost motion connection 24. Also in this case the flow of elastic fluid to the turbine part 13 decreases but the flow past valve 17 to the low pressure part 14 increases. This permits maintaining the mechanical load output of the turbine and accordingly the electric output of the generator 11 constant. Thus the interstage valve 17 in substance represents a means for shifting or distributing the mechanical load output of the turbine between the high pressure part 13 and the low pressure part 14. This is an important function of the valve 17, permitting satisfying the demand for electric energy as well as the demand for process steam.

For futher consideration we may assume constant demand for process steam in which case a change in pressure of the process steam takes place due to movement of valves 16 and 17 to control the electric load output of the turbo-generator set. The electric load output of the turbo-generator set is determined by the load connected to the power line 10. In the present instance I have indicated electric energy consumers, such as motors 9, connected to the power line 10. In accordance with my invention I provide a regulating arrangement for normally controlling the turbine in response to changes in demand for electric energy from the power line 10 to maintain substantially constant the flow of electric energy from the external line 12 to the power line 10. Thus, as the demand for electric energy from the power line 10 decreases, the turbine is controlled to decrease the electric energy output of the generator 11. The flow of energy from line 12 to line 10, as just mentioned, remains constant. However, as the decreased demand for electric energy from power line 10 reaches a value at which the electric energy output of the turbine, more specifically of the high pressure part 13 of the turbine, becomes too low to satisfy the demand for process steam, then the valve control arrangement is prevented from further closing the valve, or, from another viewpoint, is rendered in operative and the drawing energy from line 12 is no longer maintained constant, moreover is varied in accordance with changes for load demand on power line 10. This is accomplished by the provision of a load regulator, in the present instance shown in the form of a magnet having a core 32 and a coil 33 surrounding the core and receiving current from the secondary 33a of a transformer in response to changes in the flow of energy from the external line 12 to the power line 10. The magnetic flux produced by coil 33 biases the core 32 in upward direction. An adjustable compression spring 34 is provided to counteract or compensate the force of the magnetic flux, that is, to bias the core in downward direction. The core 32 is fastened to a rod 35 which has a portion pivoted to the right-hand end of a lever 36. The left-hand end of the lever 36 is connected to a speed responsive device such as a governor 37 which is driven from the turbine shaft. An intermediate point 38 of the lever 36 is linked to an intermediate point of the lever 23, more specifically to the above mentioned point 31, by means including a dashpot having a cylinder 39 connected to the point 31 of the lever 23 and a piston 40 connected to the point 38 of the lever 36. The dashpot is filled with an actuating fluid such as oil and has a bypass 41 with a valve 42 for permitting displacement of actuating fluid between the lower part and the upper part of the dashpot cylinder. If the valve 42 were completely closed, the dashpot together with the links would represent a rigid connection between points 31 and 38 of levers 23 and 36 respectively. During normal operation the valve 42 is open whereby the piston may move relatively to the cylinder 39 and thus cause shortening or lengthening of the link between points 31 and 38. Turning movement of the lever 36, due to a change in flow of energy from the external line 12 to the power line 10, causes movement of the dashpot to position valves 16 and 17 in accordance with the change of flow of energy. The arrangement includes means for restoring the position of the lever 36 when the latter has been moved out of its normal position. This means comprises a rod 43 having abutments 44 and 45 fixed thereto. The rod 43 is arranged in alinement with and connected to the dashpot piston. The abutments 44 and 45 project through openings in a fixed casing 46 including a spring 47 interposed between the abutments 44 and 45. Upward movement of the rod 43 causes compression of the spring, which latter then exerts a biasing force on the abutment 44 and tends to restore the rod 43 and the lever 36 to their normal positions. The dashpot together with the spring arrangement represents an isochronous governing means permitting independent regulation of the turbine by the speed governor 37 or by the load regulator 32, 33 and causing restoring of the normal position of the speed governor and the load governor.

In case the system, as shown in the present instance, is tied up with an alternating current power line 12 having a constant frequency, the speed of the turbo-generator set is fixed by the frequency of the external line 12 and the speed governor is preferably set for pre-emergency speed to assume control of the turbo-generator set when its speed rises beyond a predetermined value. For example, this may happen due to a breakdown of the external system. If such breakdown occurs, the operation is as follows: An increased demand for load from power line 10, which may be due to an increased number of motors 9 being connected thereto, causes a drop in speed of the turbo-generator set. The flyweights of the governor then move together, causing upward movement of the left-hand end of the lever 36 which then turns about its right-hand end and causes upward movement of the dashpot piston together with the cylinder, resulting in upward movement of the left-hand end of the lever 23 and effecting opening of the inlet valve 16 and in a certain position of the lost motion connection 24 also opening of the valve 17. The flow of elastic fluid to the turbine then rises, causing an increase in speed. If such increase in flow causes an increase in fluid pressure in the extraction conduit 18, then the pressure governor 25 operates in the manner described above, effecting closing of the valve 16 and opening of the valve 17, in other words, effecting a shifting of the relative loads between the high pressure and the low pressure turbine parts.

Let us now assume normal operation during which a fixed amount of energy is supplied to the power line 10 from the external line 12 and another amount of electric energy is supplied to the power line 10 by the turbo-generator set. Under such condition, increased demand from power line 10 at first effects an increase in the amount of energy drawn from the external power line 12. This increased flow from line 12 to line 10 causes the load governor to respond. The core 32 is moved upward against the biasing force of the spring 34 and thereby causes upward turning of the lever 36 about its left-hand end. This in turn effects upward movement of the dashpot and upward movement of the left-hand end of the lever 23 to open the valve 16 and in a certain position of the lost motion connection also opening of the interstage valve 17. Opening of the valve 16 or both valves 16 and 17 increases the flow of fluid to the turbine and accordingly mechanical load output of the turbine and the electric output of the generator 11 whereby the amount of electric energy drawn from the external line is reduced to its fixed maximum value. During this operation the right-hand end of the lever 36 has been moved upward. The lever is returned to its normal position by action of the spring 47, as explained above.

Similarly, a decrease in load demand from line 10 at first causes a decrease in energy transmitted from the external line 12 to the power line 10. This decrease causes the core 32 of the load governor to be moved downward by the action of the spring 34 whereby the lever 36 is turned downward about its left-hand end and effects through the dashpot and the lever 23 closing movement of the valve 16 or of both valves 16 and 17. During this condition the pressure governor 25 positions or repositions the valves 16 and 17 to maintain a fixed pressure in the extraction conduit 18, that is, the pressure governor distributes the load demand on the turbine in accordance with the demand for electric energy from the generator 11 and in accordance with the demand for process steam or extraction fluid. With decreasing demand for electric energy from the power line 10, a condition is attained during which the interstage valve 17 is completely closed or moved into a fixed position, and the valve 16 is in a certain opened position to satisfy the demand for process steam and the electrical output of the generator. If now the demand for electric energy from power line 10 drops further, the load governor 32, 33 would normally function to further close the valve 16, assuming the valve 17 to be closed. This, however, would cause a drop in the flow of process steam below the demand therefor.

In accordance with my invention I provide means which under the aforementioned conditions render the load regulator inoperative or, from another viewpoint, prevent the electric energy of the turbo-generator set from being reduced to a value below a value sufficient to satisfy the demand for process steam. This is accomplished by the provision of a stop member 48 provided below the lower end of the link 35 of the load regulator and connected by a link 49 to the right-hand end of a fulcrumed lever 50 having its left-hand end connected by a link 51 to an intermediate point of the lever 23, in the present instance, to a pivot 52 forming a part of the lost motion connection 24. As will be readily seen, the rod 35 may move downward in accordance with decreasing demand for electric energy from power line 10 until it engages the stop 48 where it is prevented from further downward movement. As this occurs, a further decrease in load is no longer shifted to the turbine but is satisfied by a reduction in the transfer of electric energy from the external line 12 to the power line 10. The control of the turbine is then taken over by the pressure governor 25 which then controls the valve 16 in response to the demand for process steam. From another viewpoint, the electric output of the high pressure part 13 under such condition is changed in response to changes in the demand for process steam. If the demand for process steam remains constant, as assumed above, a fixed amount of electric energy is delivered by the generator 11 to the power line 10 and a varying additional amount is drawn from the external line 12 to satisfy the demand of the motors or consumers 9 connected to the power line 10. Thus the load governor normally serves to maintain constant the amount of electric energy transmitted from line 12 to line 10 by controlling the position of valves 16 and 17 in accordance with the varying load demand from the power line 10. The load governor is rendered inoperative at decreasing load from the line 10 as soon as the electric output of the turbo-generator set drops below a value sufficient to satisfy the demand for process steam from the high pressure turbine part 13.

The performance of the arrangement is shown in Fig. 1 over a certain period of time. The curve 60 represents the energy drawn from the external line, that is, the line 12 plotted against time. Curve 61 represents the demand for energy from power line 10, and 62 represents the demand for process steam or like elastic fluid conducted through the extraction conduit of the turbine or like elastic fluid engine. In the present instance the demand for process steam remains constant. The curves clearly bring out that the electric energy (curve 60) drawn from the external line 12 remains constant as long as the demand for energy drawn from line 10 is greater than the demand for process steam, more specifically as long as the demand for electric energy from the generator is sufficient to satisfy the demand for extraction fluid. Such condition exists, for example, during the time period a. The energy drawn from the external line, however, drops below the limited maximum value during periods of load demand for electric energy from power line 10 during which the drawing of a constant amount of energy from line 12 would reduce the electric energy output of the turbo-generator to a value below that necessary or sufficient to satisfy the demand for process steam or extraction fluid. Such condition exists during the period b in the diagram.

As stated above, my improved arrangement may also be used where a power line similar to the power line 10 receiving current from an extraction turbo-generator set serves for transmitting an amount of energy to an external line, such as line 12, which amount should not drop below a fixed minimum value. Such arrangement according to my invention may be exactly like the one described in connection with Fig. 2 with the exception of the provision of a tension spring instead of the compression spring 34 in Fig. 2.

In Fig. 4 I have shown a modified portion of Fig. 2 comprising a load governor having a core 65 corresponding to the core 32 in Fig. 2 and a coil 66 corresponding to the coil 33 of Fig. 2. The core 65 is fastened to a rod 67 having its lower end connected to a lever 68 corresponding to the lever 36 of Fig. 2. Provided below the connection between rod 67 and the lever 68 is a stop or limiting member 69 corresponding to the stop means 48 of Fig. 2. The parts so far described in Fig. 4 and all other parts, not shown, are exactly the same as those in Fig. 2. The core 65 has its upper end connected to an adjustable tension spring 70 which normally tends to bias the core in upward direction in contrast to the arrangement of Fig. 2 in which the compression spring 34 biases the core in downward direction. The upper end of the spring is connected to an adjusting screw 71, permitting adjustment of the load regulator. The operation of the arrangement in accordance with Fig. 4 is similar to the one described in connection with Fig. 2. The performance of the arrangement over a certain period of time is indicated in the diagram of Fig. 3.

Let us assume the arrangement shown in Fig. 2 is provided with a tension spring corresponding to the spring 70 of Fig. 4 instead of the compression spring 34, and is operated to supply at least a fixed minimum amount of energy to the external line 12. The curve 75 in the diagram of Fig. 3 then represents the electric energy supplied from the power line 10 in Fig. 2 to the external line 12. This energy at no time drops below a fixed minimum value. The curve 76 represents the load output of the generator necessary to cover the demand for electric energy from the consumers connected to the power line 10 and the amount transmitted to the external line 12. The curve 77 represents the demand for steam or extraction fluid which has been assumed to remain constant. As long as the demand for electric energy from the power line 10 is relatively great with respect to the demand for process steam, a constant amount of energy is supplied from the power line 10 to the external line 12. Such condition exists during the time period e. When, however, the demand for electric energy from the power line 10 decreases below a value sufficient to produce or permit the flow of the desired amount of process steam, the amount of energy supplied from line 10 to the external line 12 is increased. Such condition exists during the time period f. During this time period the load regulator is rendered inoperative or prevented from further closing the turbine valve or valves and the turbine control is accomplished by the pressure governor in response to the demand for extraction fluid.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States, is,—

1. The combination of a power line, electric consumers connected thereto, an external line connected to the power line, a generator set comprising an elastic fluid engine and an electric generator driven by the engine and connected to the power line, an elastic fluid consumer receiving elastic fluid from a lower stage of the engine, means for controlling the flow of elastic fluid through the engine in response to the demand for elastic fluid in said elastic fluid consumer, a load regulator for normally controlling the flow of elastic fluid to the engine in response to the demand for electric energy by the electric consumers to maintain constant the flow of electric energy between the two lines, and means for rendering the load regulator ineffective in response to a condition of the relation between the demand for electric energy from the power line and the demand for elastic fluid by the elastic fluid consumer.

2. The combination of a power line, consumers connected thereto, an external line connected to the power line to permit the exchange of electric energy between the lines, an extraction turbine having an inlet valve and an interstage valve to control the flow of fluid therethrough, an electric generator driven by the turbine and connected to the power line, an elastic fluid consumer connected to an intermediate stage of the turbine ahead of said interstage valve as regards the direction of flow of fluid through the turbine, a load regulator for controlling the valves in response to the demand for electric energy from the power line to maintain the flow of electric energy between the two lines normally constant, means for rendering the load regulator ineffective in a fixed position of the interstage valve, and means for controlling the valves in response to the demand for elastic fluid in the elastic fluid consumer.

3. The combination of a power line, electric consumers connected to the power line, an external line connected to the power line for supplying energy thereto, a turbine comprising a high pressure part having an inlet valve and an extraction conduit, a low pressure part and a conduit including an interstage valve for conducting elastic fluid from the high pressure part to the low pressure part, an elastic fluid consumer connected to the extraction conduit, an electric generator driven by the turbine and connected to the line, means including a load regulator responsive to the flow of electric energy from the external line to the power line for controlling the valves in response to the load demand from the power line to normally maintain the flow of energy from the external line to the power line constant, a pressure regulator connected to the extraction conduit for distributing the load between the high pressure and the low pressure turbine to maintain the pressure in the extraction conduit constant, and means for limiting movement of the load regulator to permit variation of the transfer of electric energy from the external line to the power line.

4. The combination of a power line, electric consumers connected to the power line, an external line connected to the power line for supplying energy thereto, a turbine comprising a high pressure part having an inlet valve and an extraction conduit, a low pressure part and a conduit including an interstate valve for conducting elastic fluid from the high pressure part to the low pressure part, an elastic fluid consumer connected to the extraction conduit, an electric generator driven by the turbine and connected to the line, means including a load regulator responsive to the flow of electric energy from the external line to the power line for controlling the valves in response to the load demand from the power line to normally maintain the flow of energy from the external line to the power line constant, a pressure regulator connected to the extraction conduit for distributing the load between the high pressure and the low pressure turbine to maintain the pressure in the extraction conduit constant, and means for limiting movement of the load regulator to permit variation of the transfer of electric energy from the external line to the power line, said last-named means rendering the load regulator automatically ineffective in response to a certain ratio of the load demand by the electric consumers to the load demand by the elastic fluid consumer.

5. The combination of a power line, consumers connected thereto, an external line connected to the power line and receiving a fixed minimum amount of electric energy from the power line, a generator connected to the power line, an extraction turbine for driving the generator, the turbine having an inlet valve, an extraction conduit for discharging elastic fluid at a certain pressure and an interstage valve behind the extraction conduit for controlling the flow of fluid to the lower turbine stages, means including a power regulator for controlling the valve in response to the load demand in the power line to normally maintain the flow of electric energy from the power line to the external line constant, a pressure regulator connected to the extraction conduit for normally controlling the relative positions of the two valves to distribute the load on the high pressure turbine part and the low pressure turbine part in response to pressure changes of the discharged elastic fluid, and means for rendering the load regulator inoperative in a certain position of the interstage valve and permitting the flow of electric energy from the power line to the external line to rise beyond the minimum value.

6. The combination of a power line, consumers connected thereto, an external line connected to the power line and receiving a fixed minimum amount of electric energy from the power line, a generator connected to the power line, an extraction turbine for driving the generator, the turbine having an inlet valve, an extraction conduit for discharging elastic fluid at a certain pressure and an interstage valve behind the extraction conduit for controlling the flow of fluid to the lower turbine stages, means including a power regulator for controlling the valves in response to the load demand in the power line to normally maintain the flow of electric energy from the power line to the external line constant, a pressure regulator connected to the extraction conduit for normally controlling the relative positions of the two valves to distribute the load on the high pressure turbine part and the low pressure turbine part in response to pressure changes of the discharged elastic fluid, and means for rendering the load regulator inoperative in a certain position of the interstage valve and permitting the flow of electric energy from the power line to the external line to rise beyond the fixed minimum value, the last-named means comprising a stop linked to the interstage valve and disposed to be engaged by a member of the load regulator, the stop being moved towards the member in response to the decrease in demand for electric energy from the power line and engaging the member as a certain relation is reached between the demand for electric energy by the consumers and the discharge of elastic fluid from the extraction conduits.

ARTHUR ROSCH.

CERTIFICATE OF CORRECTION.

Patent No. 1,969,526. August 7, 1934.

ARTHUR ROSCH.

It is hereby certified that error appears in the printed specification of the above numbered patent requiring correction as follows: Page 5, line 4, claim 4, for "interstate" read interstage; line 39, claim 5, for "valve" read valves; and line 119, claim 6, for "conduits" read conduit; and that the said Letters Patent should be read with these corrections therein that the same may conform to the record of the case in the Patent Office.

Signed and sealed this 11th day of September, A. D. 1934.

Leslie Frazer (Seal) Acting Commissioner of Patents.